US008320839B2

(12) United States Patent
Huber et al.

(10) Patent No.: US 8,320,839 B2
(45) Date of Patent: Nov. 27, 2012

(54) METHOD FOR TESTING A MOBILE-RADIO DEVICE

(75) Inventors: Rolf Huber, Fuerstenfeldbruck (DE); Stephan Sandhaeger, Germering (DE); Walter Schatz, Hoehenkirchen (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 307 days.

(21) Appl. No.: 12/665,969

(22) PCT Filed: May 13, 2008

(86) PCT No.: PCT/EP2008/003817
§ 371 (c)(1),
(2), (4) Date: Dec. 22, 2009

(87) PCT Pub. No.: WO2009/000367
PCT Pub. Date: Dec. 31, 2008

(65) Prior Publication Data
US 2010/0190451 A1    Jul. 29, 2010

(30) Foreign Application Priority Data

Jun. 27, 2007 (DE) .......................... 10 2007 029 711
Feb. 21, 2008 (DE) .......................... 10 2008 010 290

(51) Int. Cl.
*H04B 17/00* (2006.01)

(52) U.S. Cl. ...................... 455/67.14; 455/466; 455/423; 455/67.11; 455/67.13; 455/425; 455/115; 455/424; 455/446; 370/245

(58) Field of Classification Search ............... 455/67.14, 455/67.11, 67.13, 423, 425, 466, 115, 424; 370/245
See application file for complete search history.

(56) References Cited

U.S. PATENT DOCUMENTS

| 6,219,544 | B1 * | 4/2001 | Suutarinen ................... 455/423 |
| 6,560,723 | B1 | 5/2003 | Matsui |
| 7,436,776 | B2 | 10/2008 | Koga |
| 2002/0183054 | A1 * | 12/2002 | Rimoni et al. ............... 455/423 |

(Continued)

FOREIGN PATENT DOCUMENTS

EP    1 480 379 A1    11/2004

(Continued)

OTHER PUBLICATIONS

Gotz, Reiner, "R&S TM CRTU Protocol Test Platform User-friendly definition of 2G and 3G signaling scenarios", News from Rohde & Schwarz, No. 193, Jun. 25, 2007 (http://www2.rohde-schwarz.com/file_7489/n193:crtu.pdf).

(Continued)

*Primary Examiner* — Temesgh Ghebretinsae
*Assistant Examiner* — Md Talukder
(74) *Attorney, Agent, or Firm* — Ditthavong Mori & Steiner, P.C.

(57) ABSTRACT

A method for testing a mobile-radio device is provided. The method includes determination of information regarding at least one real mobile-radio network using a measuring device, and additionally and independently using a mobile-radio device. The method further includes analysis of the information, received through the measuring device and through the mobile-radio device, regarding the mobile-radio network using an analysis device, analysis of all signals incoming to and respectively outgoing from the mobile-radio device using an analysis device, conversion of the information into an instruction sequence, and simulation of the real mobile-radio network through the implementation of at least a part of the instruction sequence by the test device.

20 Claims, 7 Drawing Sheets

U.S. PATENT DOCUMENTS

| | | | |
|---|---|---|---|
| 2003/0069010 A1* | 4/2003 | Eravelli | 455/423 |
| 2006/0205398 A1* | 9/2006 | Seckendorf et al. | 455/423 |
| 2006/0223521 A1* | 10/2006 | Buyse | 455/423 |
| 2007/0049266 A1* | 3/2007 | Voss | 455/423 |
| 2008/0220777 A1* | 9/2008 | Kouadjo et al. | 455/435.1 |
| 2009/0023459 A1* | 1/2009 | Wigren | 455/456.1 |
| 2009/0209250 A1* | 8/2009 | Huq | 455/425 |
| 2010/0197299 A1* | 8/2010 | Huber et al. | 455/425 |

FOREIGN PATENT DOCUMENTS

| | | |
|---|---|---|
| EP | 1 549 092 A1 | 6/2005 |
| JP | 09-116624 A | 5/1997 |
| JP | 2003-209631 A | 7/2003 |
| JP | 2005-109992 A | 4/2005 |
| JP | 2006-101160 A | 4/2006 |
| JP | 2007-177732 A | 7/2007 |
| WO | WO 2007/022811 A1 | 3/2007 |

OTHER PUBLICATIONS

International Search Report, WO 2009/000367 A1, Oct. 24, 2008, pp. 32-37.

International Preliminary Report on Patentability, PCT/EP2008/003817, May 3, 2010, pp. 1-5.

* cited by examiner

| FTP_Transfer.f2l.txt |

R1

Phylis2XMLExporter running using following configuration:
   Replay hardware: 1xCRTU-W
   Power replay: off
   print cell activity intervals: off
   print cell events: off
   debug level: off MibManipulationAgent: MIB changed MCC:MNC from (262:1) to (1:1)
Cell: :verifySIB: cell=159/10836 has no SIB 1
Cell 159/10836 has not all it needs
Cell 94/10836 has all it needs
Cell: :has AllNeededMIBSIB: cell=137/10836 has no MIB
Cell 137/10836 has not all it needs
Cell: :hasAllNeededMIBSIB: cell=334/10836 has no MIB
Cell 334/10836 has not all it needs
Configuration: Power replay is off
Registration (SysInfo1) Mode: NM02

| Fig. 6A | Fig. 6B |

METHOD FOR TESTING A MOBILE-RADIO DEVICE

CROSS-REFERENCE TO RELATED APPLICATION

The present application is a national phase application of PCT Application No. PCT/EP2008/003817, filed on May 13, 2008, and claims priority to German Application No. 10 2007 029 711.6, filed on Jun. 27, 2007, and German Application No. 10 2008 010 290.3, filed on Feb. 21, 2008, the entire contents of which are herein incorporated by reference.

BACKGROUND OF THE INVENTION

1. Field of the Invention

The invention relates to a method for testing mobile-radio devices.

2. Discussion of the Background

Methods, with which mobile-radio devices can be tested by measuring the mobile-radio signals of a mobile-radio network under real conditions within a so-called field test, for example, by means of a test network, are known from the prior art. The interoperability, the interplay between mobile-radio device and the base stations of one or more radio networks within a rented test network or in the real field are tested.

The disadvantage with the prior art is that testing in a rented test network is extremely expensive. If testing is carried out in a real field, the conditions are often not reproducible, because the marginal conditions such as cell power, timing, loading etc. vary continuously.

Moreover, methods, which simulate and test a mobile-radio network in a laboratory regarding whether a mobile-radio device responds "correctly", that is to say, in conformity with standards, are known from the prior art. For this purpose, the precise procedure of the communications protocol must be observed through signalization routines. A programmed procedure then controls a protocol tester or signal generator for the simulation of a network.

The remoteness from reality of these self-programmed tests within a test environment is disadvantageous. Programmers tend (unconsciously) to develop scenarios, which are too simple and therefore fail to satisfy the demands on the mobile-radio device under real conditions. Moreover, the programming of the instruction sequences is very troublesome and therefore very susceptible to error. Accordingly, these laboratory tests can be transferred to reality and vice versa only with great difficulty. They have only a very low predictive power regarding whether the tested mobile-radio device will also function in an error-free manner under real conditions.

SUMMARY OF THE INVENTION

A method is provided which tests mobile-radio devices realistically and cost favorably. Testing under real conditions and testing in the laboratory are to be combined.

In a real network, information regarding the network is determined by means of a measuring device. For example, a network scanner is sent on a test run within a real environment. Accordingly, information generated by the base stations regarding the real network is determined during the operation of at least one real mobile-radio network. Alternatively, the information can also be determined in a test laboratory, for example, during the implementation of an interoperability test. An analysis device analyzes the information obtained regarding the at least one mobile-radio network. The analyzed information of the signalization signals is converted into an instruction sequence capable of being read and therefore executed by a test device, for example, a signal generator. This instruction sequence can be stored, for example, in a given format. The format is matched to the test device, so that a reproducible test scenario, which can be replayed through the test device, is now available. A test device, which therefore simulates the real network environment, is controlled with this instruction sequence.

On this test run, a mobile-radio device transmits signals and response signals as digitally-coded electromagnetic waves within the giga-Hertz range to the base stations and conversely receives signals from the base stations. A measuring device for determining the information of the mobile-radio network measures all of the incoming radio signals from the base stations. In this context, the protocol data digitally encoded within the radio signals are of interest, not the user data. In the following section, these protocol data of the base stations are referred to as signals; those of the mobile-radio device communicating with them are referred to as response signals.

The mobile-radio device is prepared in such a manner that it routes the signals received from the base stations and the response signals transmitted to the base stations to the analysis device. The analysis device receives the data transmitted from the prepared mobile-radio device. These data are analyzed by the analysis device and stored on the hard disk. In this context, the analysis device also analyzes network-external signals, which are similarly determined by the network scanner used. The totality of information is stored in a common log file. In this context, a prepared mobile-radio device or test mobile-radio device in the sense of the invention is a mobile-radio device, which can output via an interface information regarding messages communicated between the mobile-radio device and at least one base station. Moreover, information regarding the radio field is communicated by the test mobile-radio device.

The following information regarding the at least one mobile-radio network is analyzed by the analysis device and used at least partially for the generation of the instruction sequence:

a.) All necessary radio cells, especially the IDs of the base stations of the radio cells and cell parameters, such as the cell timing in the case of UMTS.
b.) Determination of a required registration. If no registration is available, use is made of a standard registration.
c.) All necessary layer-3 messages. In the OSI model, layer 3 is the network layer.
d.) All cell information necessary for the replay of the cell power.
e.) The real time-procedures, especially the time position of adjacent cells relative to one another.
f.) Procedure of the security algorithms. Since the algorithms used in the network are proprietary, the replay uses a standard test USIM and algorithms based upon test specifications, such as those described by the working group 3GPP in TS 34.108.109.

The information determined is now converted into a readable instruction sequence and preferably stored. If the instructions of the instruction sequence are not adequate during the conversion into the readable format for the simulation of a connection between the mobile-radio device and the emulated base station, the reason, why the test scenario is not capable of replay, is determined, preferably automatically, and missing instructions in the instruction sequence are supplemented.

In a further step, the instruction sequence is listed in a list on a graphic user surface. In this context, one line is preferably allocated to each individual instruction. Accordingly, for example, subsequent data can be modified: instructions can be skipped, copied, inserted and deleted. Moreover, an editing of layer-3 data is possible. The editing of individual messages is implemented, for example, by means of an editor. A test device is controlled with the instruction sequence obtained in this manner.

The test device is preferably a protocol tester. Within a test laboratory, this protocol tester simulates one or more mobile-radio networks. For this purpose, the test device reads in the readable instruction sequence originating from the analysis device and re-converts this into the signals measured in the real environment and therefore reproduces one or more mobile-radio networks. Accordingly, the protocol tester enters into interaction with a mobile-radio device under test. The protocol tester transmits these radio signals to the mobile-radio device under test. For its part, the mobile-radio device under test responds to the data transmitted from the protocol tester and transmits response signals within the simulated mobile-radio network, with which it is communicating. The anticipated response signals are known from the original recording of the real scenario and marked in the tabular instruction sequence as non-executable instructions. During the simulation, the corresponding messages are transmitted by the mobile-radio device under test. These messages are anticipated by the protocol tester and compared with the messages, which are marked in the instruction sequence as incoming messages. The further implementation of the subsequent instruction lines in the sequence is only implemented if the anticipated message, that is, the response signal of the mobile-radio device under test has arrived.

In this context, a test is implemented to determine whether the mobile-radio device observes the communications protocols according to a valid standard for the simulated mobile-radio network and responds as anticipated to incoming signals from base stations. The mobile-radio device is called via the simulated mobile-radio network. Accordingly, the correct response, for example, to an incoming call is tested.

The protocol tester can also replay only a part of the instruction sequence. In this context, it can happen that this partial instruction sequence is incomplete. In this case, the missing instructions are automatically supplemented by the protocol tester.

The instruction sequences are output, for example, via a display and are editable via a graphic user surface. For this purpose, the instructions of the instruction sequence to be replayed are listed in the list. The editor is operated with a mouse or via buttons. Individual instructions or several instructions can be modified, copied and inserted in a different place. It is also possible to delete one or more instructions of the instruction sequence. Accordingly, new test scenarios can also be developed without the need for further test runs in a real environment.

The test scenarios are preferably stored and can be replayed as often as required. For the communication between the mobile-radio device under test and the protocol tester, there are two modes. In the first mode, the protocol tester anticipates the response signals to its signals transmitted to the mobile-radio device under test exactly as they were determined during the recording in the real mobile-radio network or a preceding laboratory interoperability test and are listed as response signals in the instruction sequence. If the response signals do not agree with the response signals actually transmitted back by the mobile-radio device under test, the test is immediately terminated. This mode is referred to as "strict mode".

In a second mode, the protocol tester transmits its data to the mobile-radio device under test corresponding to the instruction sequence to be replayed. The mobile-radio device then responds to the protocol tester by transmitting back a response signal. In this context, there can be deviations in the sequence of the response signals transmitted back from the anticipated sequence. In the second mode, the response signals transmitted by the mobile-radio device can deviate from those anticipated, provided the underlying mobile radio standard permits such a deviation, that is to say, does not, for example, prescribe a sequence of messages. However, the test scenario is still continued, in that the underlying instruction sequence is still worked through line by line. This mode is referred to as "tolerant mode". This mode is advantageous, if individual mobile-radio devices behave slightly differently and scenarios for regression tests are used with the replay software.

Both in the strict mode and also in the tolerant mode, it is possible to adjust uplink messages—that is, the data which the mobile-radio device transmits to the base stations—with bit-wise accuracy, on the basis of individual mobile radio data. This is referred to as "constraint matching".

In a preferred test scenario, the protocol tester can test the reception and transmission power by simulating different cell powers. For this purpose, the protocol tester reduces the transmission and reception power of a simulated base station X, so that the mobile-radio device can record radio contact with the base station X only with difficulty or not at all. A test is then implemented to determine whether, as anticipated, the mobile-radio device switches to the next base station Y, which provides a better transmission and reception power than the base station X. One further test scenario, the protocol tester can increase the power of a simulated base station X and test whether the mobile-radio device switches to this base station X, if it has previously communicated with the base station Y, which provides a weaker transmission and reception power than the base station X. This switching from one base station to the next is referred to as "handover" and can be induced through the indication of specifically-defined powers.

Within these scenarios, the protocol tester adapts the cell powers of the most important cells at identical time intervals corresponding to the recorded cell powers. In order to protect the test scenario from external electromagnetic interference, the mobile-radio device is preferably located in a screening chamber, which operates like a Faraday cage.

The tests in the laboratory environment are reproducible and editable and can therefore be implemented more quickly and more cost favorably. Measurements with the measuring device and a prepared mobile-radio device need only be taken once under real conditions in order to record the signalization information. The measuring device is preferably used alongside the prepared mobile-radio device or test mobile-radio device, because the measuring device is faster, more comprehensive and more accurate with regard to a plurality of information regarding the mobile-radio network or the mobile-radio networks. During a real field test and its radio signals, the mobile-radio device is not calibrated. Moreover, (many) radio cells cannot be adequately analyzed. By contrast, with the measuring device, no information is lost and the replay in the laboratory corresponds even more accurately to the real conditions. The conversion of the data into the readable instruction sequence need not be implemented manually, but happens automatically. New test scenarios can be prepared through the editability, without the necessity for new test runs in the real environment.

In the case of the replay during the test, the mobile-radio device under test can also be used in place of the test mobile-radio device. That is to say, the scenario occurring in the test is recorded and a new instruction sequence is generated from this.

BRIEF DESCRIPTION OF THE DRAWINGS

In the following description, one preferred embodiment of the invention is explained in greater detail with reference to the drawings. The drawings are as follows.

DETAILED DESCRIPTION OF EXEMPLARY EMBODIMENTS OF THE INVENTION

Figure 1:
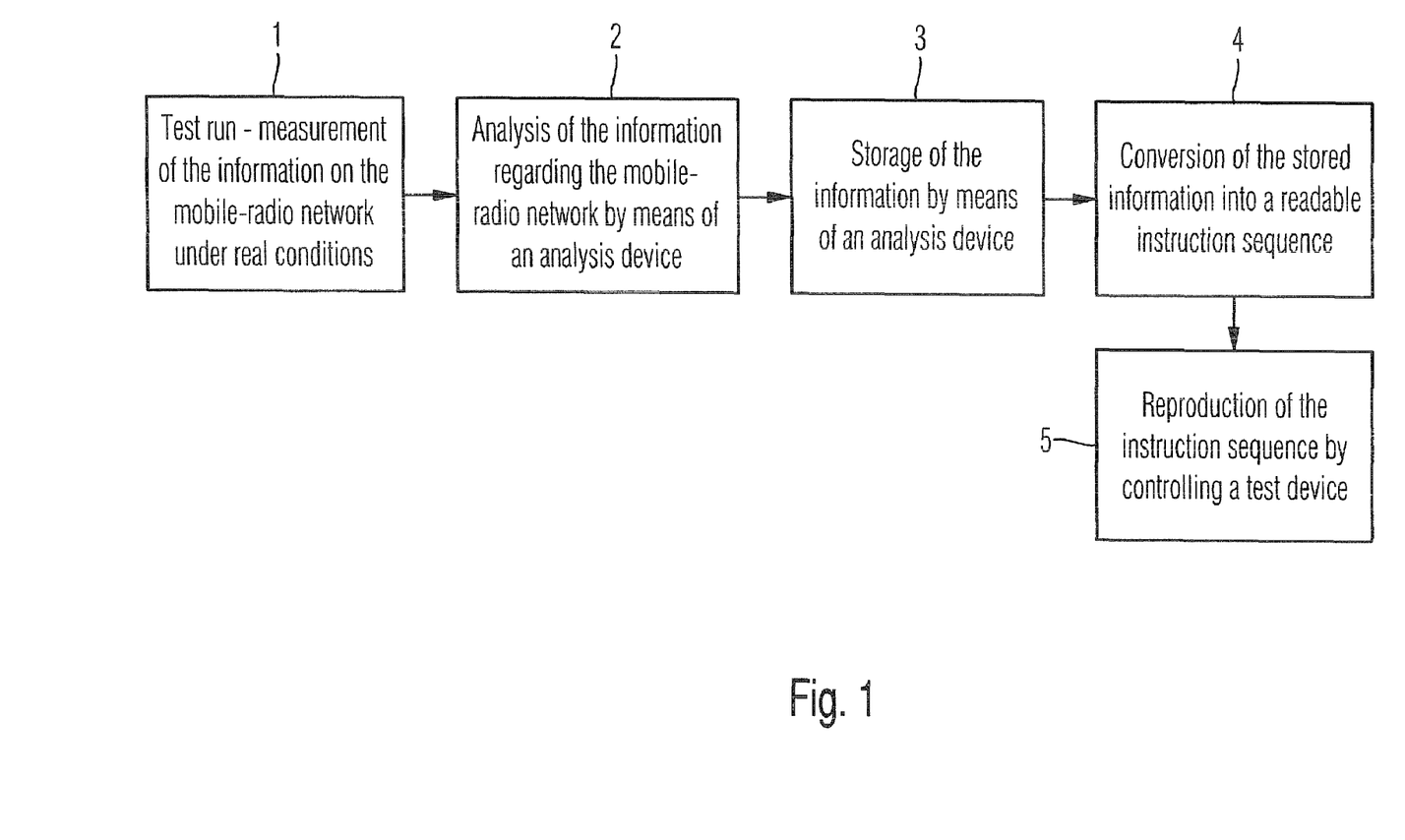
FIG. 1 shows a schematic presentation for the implementation of the method according to the invention.

FIG. 1 provides a schematic overview of the method. In a first step 1, under real conditions on a test run, information of at least one mobile-radio network is measured using a prepared mobile-radio device. In a further step 2, an analysis device analyzes the information regarding the at least one mobile-radio network. In the next step 3, the information is stored by means of the analysis device. In this context, the storage medium can be a hard disk.

In a further step 4, the stored information is converted into a readable instruction sequence. A readable instruction sequence is a sequence of control instructions, which is executable by means of the signal generator in order to generate mobile radio signals. In the final step 5, the instruction sequence is reproduced through the control of a test device. In this context, the test device, for example, a protocol tester, simulates the processes in the recorded, real radio network by working through the instruction sequence line by line. Accordingly, as in the real network, a response of the booked or booking mobile-radio device under test, is partially anticipated. If a response of this kind is not present, the protocol tester goes into a waiting condition. The anticipated response signals are marked as non-executable but contained in the instruction sequence.

Upon the occurrence of a non-anticipated message of the mobile-radio device under test at this timing point, that is to say, a deviation from an anticipated instruction, a distinction must be made between the two modes "tolerant" and "strict". In the strict mode, this leads to an interruption with a corresponding error output; while in the tolerant mode, the arrival of the anticipated message, or respectively of the response signal, is initially awaited. In the tolerant mode, if this eventually arrives, the method is continued.

Figure 2:
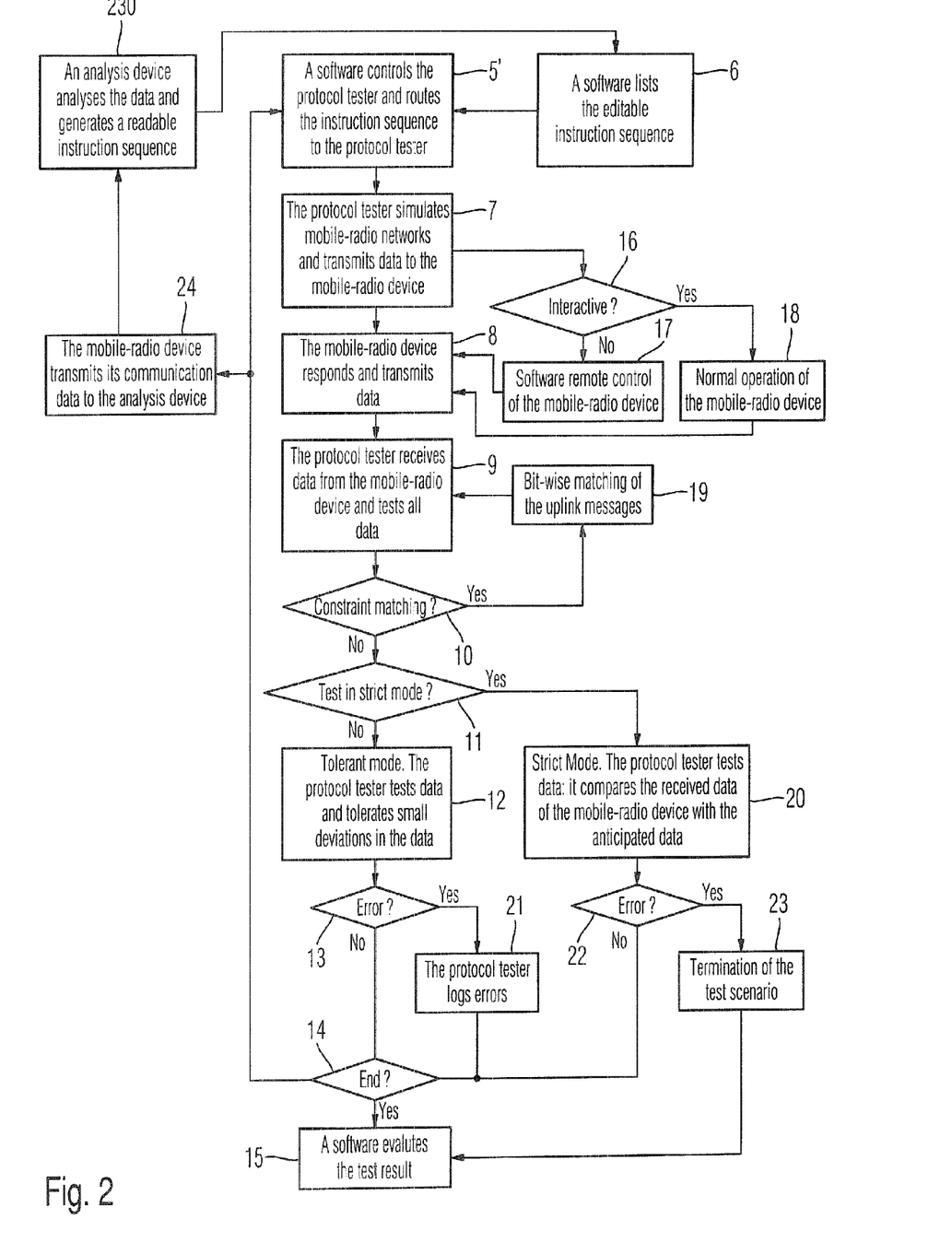
FIG. 2 shows a procedural plan for the implementation of the method.

FIG. 2 shows a more precise procedure of the method. In step 6, the readable instruction sequence provided by the analysis device is loaded into a memory and visualised in a list on a graphic user surface. This list of the instruction sequence can now be edited.

In this context, there is the possibility to prepare new test scenarios and amongst others to store filenames or also to generate abbreviated scenarios by extracting the sequence of instructions from the overall instruction set. For example, if the data obtained from the field test on the test run contain the data from three base stations, the instruction sequence can be modified in such a manner that only the signals from two base stations are still contained. The instructions listed line-by-line can be selected individually.

In step 5', the working through of the instruction sequence is started, and a protocol tester is controlled for the simulation of the network. This protocol tester therefore reproduces at least one mobile-radio network (step 7), by receiving the control instructions and converting them back into mobile radio signals.

The interrogation 16, regarding whether the system is operating in the interactive mode or whether the mobile-radio device under test is to be controlled remotely, is now worked through. In the first case 18, it is possible to respond interactively to these received signals; in other words, the mobile-radio device is operated normally through the key pad, that is, by an operator. By contrast, in a second case 17, the mobile-radio device is control remotely, whenever an entry on the mobile-radio device is required during the test. In a next step 8, the prepared mobile-radio device responds to the signals received from the protocol tester. The interrogation 10, regarding whether the test is to be run in "constraint matching" mode or not, is now implemented.

If the so-called "constraint matching" is switched on, in case 19, a bit-wise matching of the uplink data, which are transmitted by the mobile-radio device to the simulated base station, that is, the protocol tester, is implemented. If the "constraint matching" mode is not switched on, the interrogation 11, regarding whether the test is to be run in the strict mode, is implemented.

In the strict mode 20, as already explained, the protocol tester compares the response signals transmitted by the mobile-radio device precisely with the anticipated signals. This is followed by the interrogation (step 22): Is there a deviation? If yes, the termination of the test scenario (step 23) is implemented immediately.

By contrast, if the tolerant mode 12 is activated, the protocol tester tests the signals transmitted from the mobile-radio device and tolerates relatively small deviations, for example, in the instruction sequence. These small deviations can relate to the sequence of response signals or the contents of the returned response signals.

This is followed by the interrogation 13, regarding whether an error, which is disposed within the tolerance range, has occurred. If yes, the error is logged 21, but the test is continued. As the prepared mobile-radio device did under real conditions in the field test, the mobile-radio device under test transmits all of the signals transmitted and received by it to the analysis device.

This is followed by the interrogation 14: Has the entire instruction sequence now been worked through? If no, the software continues to control the protocol tester with the next instruction in the instruction sequence. If yes, the test is terminated. A test evaluation device evaluates the test result in step 15.

Figure 3:
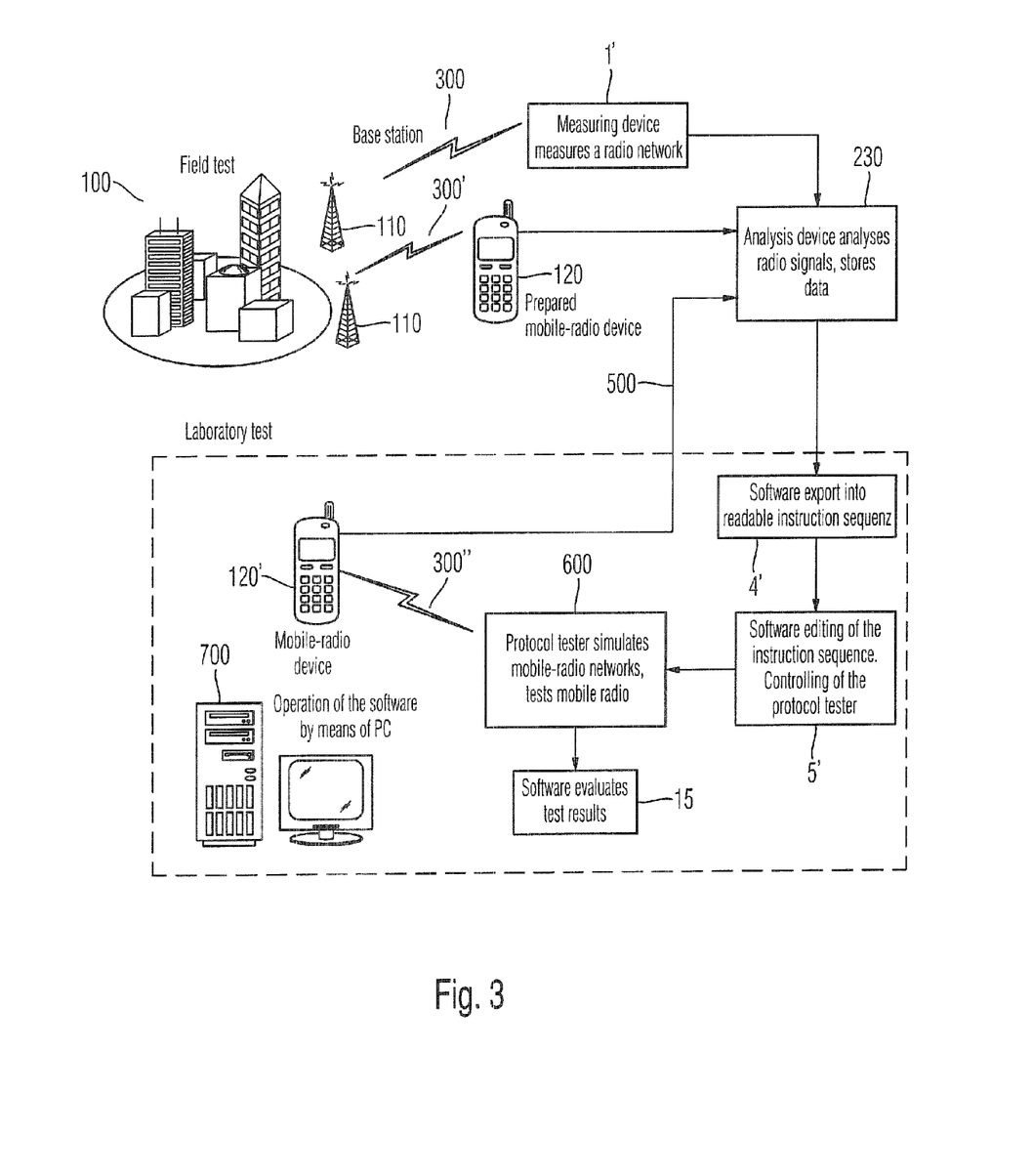
FIG. 3 shows an overview of the method as a whole.

The substantial procedure of the method as a whole is visualised in FIG. 3 in the form of functional blocks. In a field test, several base stations 110 of one or more mobile-radio networks are disposed in a real environment. A prepared mobile-radio device 120 transmits signals 300 and receives response signals 300 in the downlink from one of the base stations 110. Superimposed on these radio signals, exchanged for the information transmission between the prepared mobile-radio device 120 and a base station, are signals of the other base stations, for example, adjacent cells.

The signals 300 of these base stations 110 and the signals, which the mobile-radio device 120 transmits, are measured by a measuring device 1', for example, a network scanner. The prepared mobile-radio device 120 routes its transmitted and received response signals and signals 300' to an analysis device 230. Similarly, the measuring device 1' routes the signals it receives to the analysis device 230. The analysis device 230 analyzes the signals 300 and 300' and stores the data obtained from them. By contrast with the prepared mobile-radio device, the measuring device in this case can also determine information about such mobile-radio networks, in which no information is available regarding the mobile-radio device. Moreover, the information determined by the measuring device regarding the networks is more precise than that determined by the prepared mobile-radio device.

These data are exported by the analysis device, converted into a readable instruction sequence and stored in a format executable by the protocol tester. A software allows the editing of the instruction sequence. Finally, the protocol tester is controlled with the instruction sequence. In this context, the instruction sequence need not originate exclusively from the analysis device, but can itself be additionally programmed with the software, for example, by adding further instructions. The addition can also be implemented automatically. For this purpose, the instruction sequence is checked with regard to completeness. "Completeness" means that all instructions for the generation of a standardized signal by the test device are available. If missing instructions are determined during this test, for example, missing registration sequences, these are automatically added.

The protocol tester 600 executes the instructions and therefore reproduces at least one mobile-radio network. The mobile-radio device under test 120' transmits signals 300" as response signals 300". The transmitted and received signals 300" are routed from the mobile-radio device under test 120' to the analysis device 230. A test evaluation device 15 evaluates the test results.

As indicated in a simplified manner by the arrow 500, a recording of the data determined by the mobile-radio device under test can already be implemented again during the replay of a scenario. In this case, the mobile-radio device under test 120' becomes a test mobile-radio device at the same time. For this purpose, it must be capable of transmitting the data, for example, via an additional interface.

Figure 4:
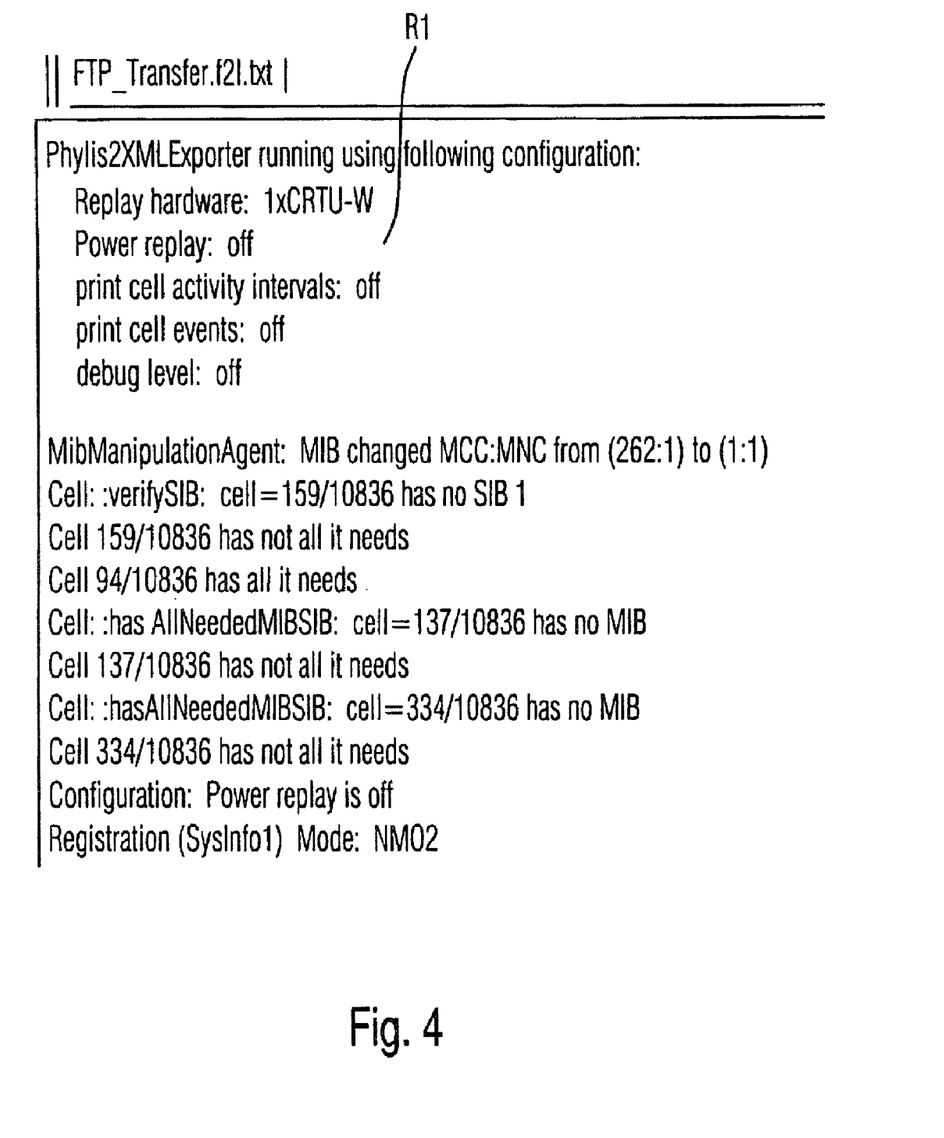
FIG. 4 shows the graphic user surface for software for the conversion of the data into readable and executable instruction sequences.

In FIG. 4, the individual processes for the export of the data in a readable format are listed in a user surface in the form of a report R1. All of the necessary changes of the test scenario during the export process are also logged in this report. If the data are insufficient for a simulation, the reason why the test scenario cannot be replayed is determined. In this context, missing instructions in the instruction sequence are automatically supplemented.

Figure 5:
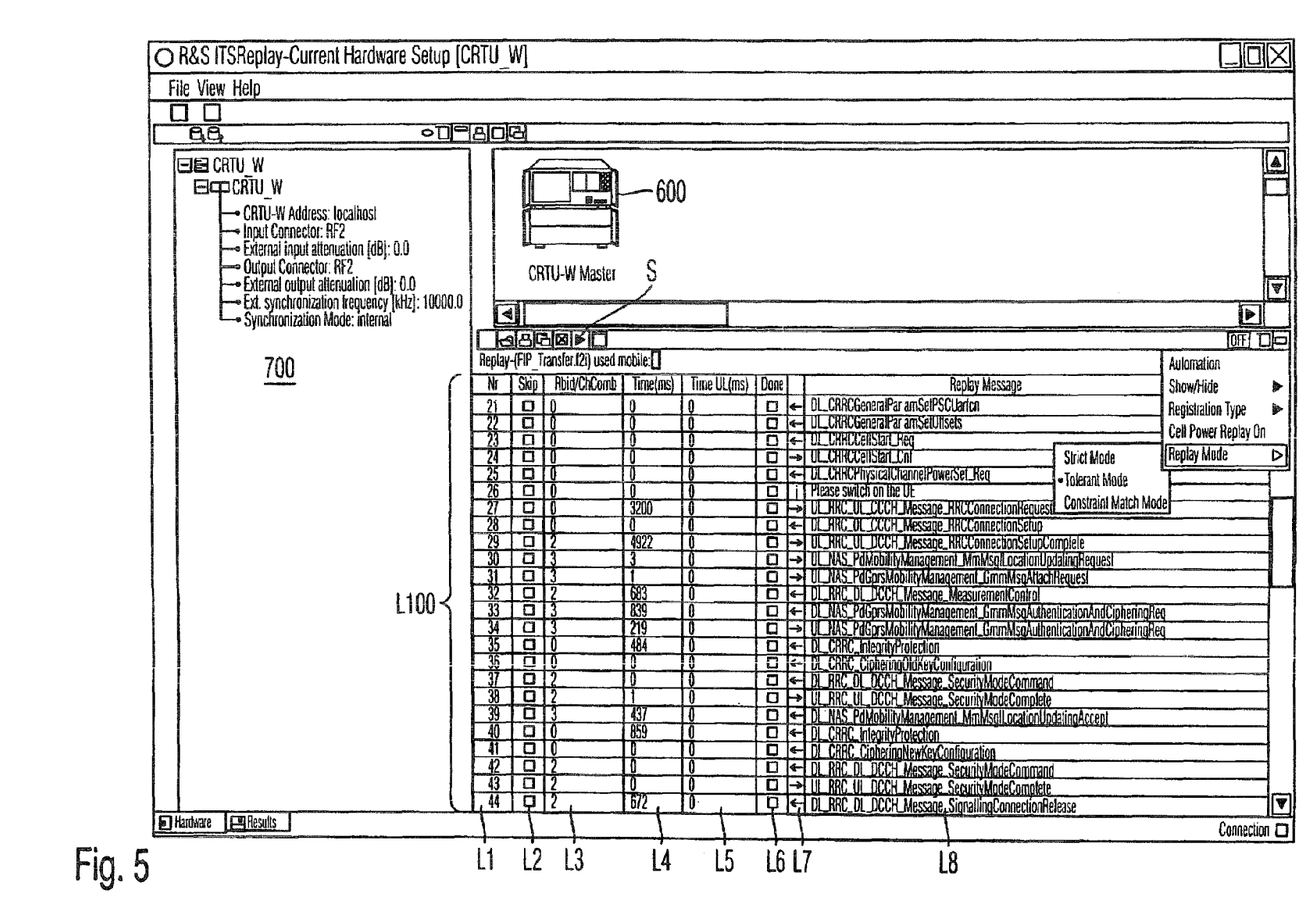
FIG. 5 shows a graphic user surface of the software for editing the instruction sequences.

FIG. 5 presents the user surface of the software, with which the test scenarios can be replayed flexibly with the protocol tester 600.

Within the user surface, a region 700 is formed, in which the current configuration for the implementation of the test is indicated. In the present case, the test scenario is replayed with the assistance of the device CRCU-W. Furthermore, some further details for the implementation of the test, such as the use of a given one of several high-frequency inputs and/or outputs, are indicated. In the example presented, the high-frequency input RF2 is used. Moreover, an input attenuation and an output attenuation can be set. In the illustrated example, both are set to 0 dB, that is to say, no attenuation. Finally, information regarding synchronization is provided. The device used here can be synchronized both by means of an internal synchronization source or an external synchronization source.

In the illustrated example, a diagram of the protocol tester is shown at top right. For the method according to the invention, the list L100 of instruction sequences at bottom right is primarily relevant. With the software, instruction sequences can be loaded into the list L100 and edited. The instruction list originates from an export of measured data in a format, which the protocol tester 600 can read and execute, wherein individual instructions can be additionally programmed and can therefore also be edited in this user surface.

In the list L100, one instruction 501 of the instruction sequence is listed per line with additional information and buttons. This list L100 comprises 8 columns L1 to L8, which will be explained below.

The column L1 shows a running number for each instruction line. The column L2 provides a button in the form of a selection box for every line. If a tick is entered by clicking on the selection box with the mouse, the instruction in this respective line will be skipped. If no tick is inserted, the instruction in the respective line will be executed. Accordingly, instruction sequences can be generated in a flexible manner.

The illustration shows a user surface for a UMTS mobile-radio connection. In this context, the "Radio Bearer ID" is indicated in column L3.

The fourth column L4 indicates the relative execution time of the respective instruction in milliseconds as a delay relative to the preceding instruction. If several instructions are transmitted in parallel, the delay occurring in the respective string is indicated relative to the preceding instruction of the same string. The next column L5 indicates the relative execution time of the uplink in milliseconds. The column L6 indicates in the form of a selection box, whether the respective instruction has already been worked through. If the tick has been inserted, the respective instruction has already been worked through. The selection box is not editable and is used only for the display.

The column L7 indicates with arrows symbols, whether an uplink instruction or a downlink instruction is involved: for an uplink instruction, the graphic symbol "arrow right" appears, and with a downlink instruction, the graphic symbol "arrow left" appears. In this context, it should be taken into consideration, that only the downlink instructions are actually executed. The uplink instructions are actually the anticipated response signals of the mobile-radio device under test and are marked by means of the arrow direction as non-executable. These instructions form the basis of the test regarding whether the mobile-radio device under test has responded as anticipated.

The column L8 finally indicates the instructions themselves, which are editable. Instructions can be deleted, amended, added and displaced. It is also possible to cut out a part of a listed instruction sequence and to start only this cut-out instruction sequence via the start button S. The editing can also be implemented by means of a separate program, which is called up upon the selection of the instruction to be amended.

Figures 6, 6A:
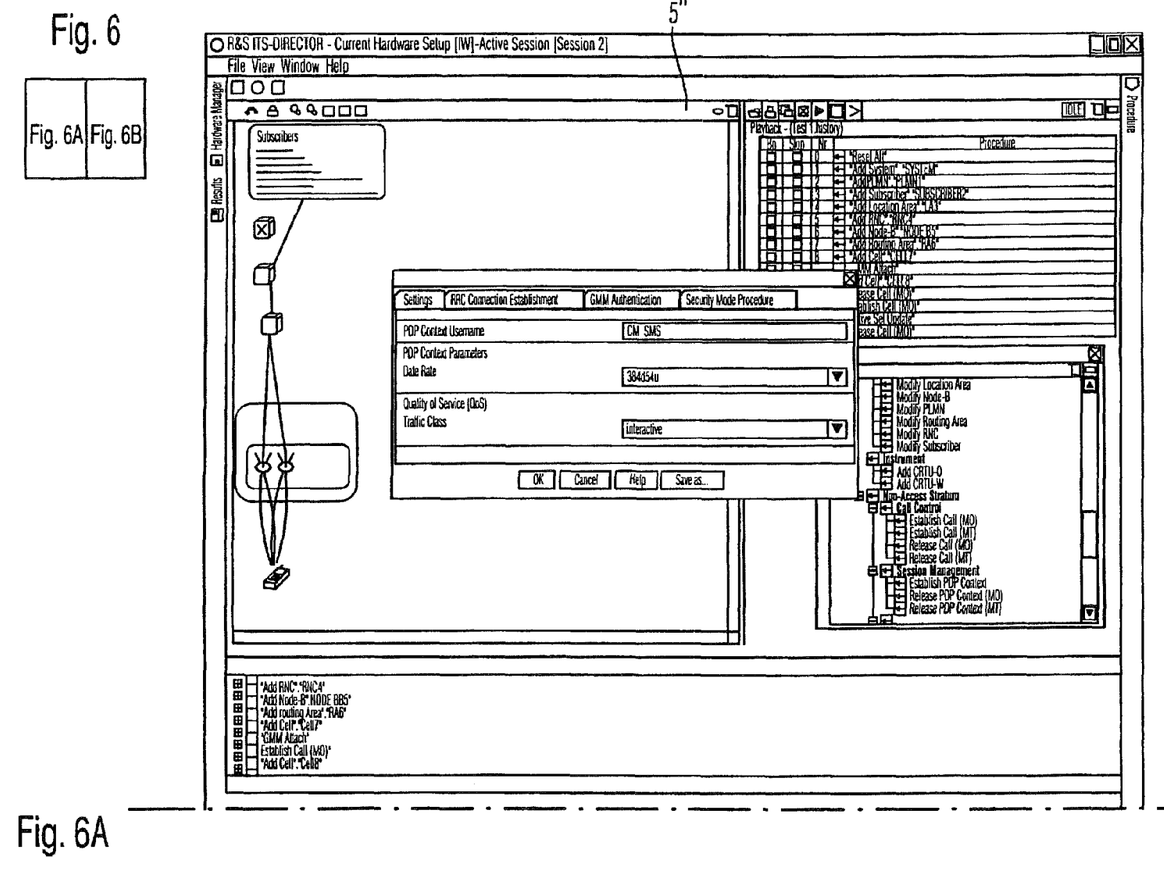
FIG. 6 shows a graphic user surface of the software for the preparation of test scenario.
Figure 6B:
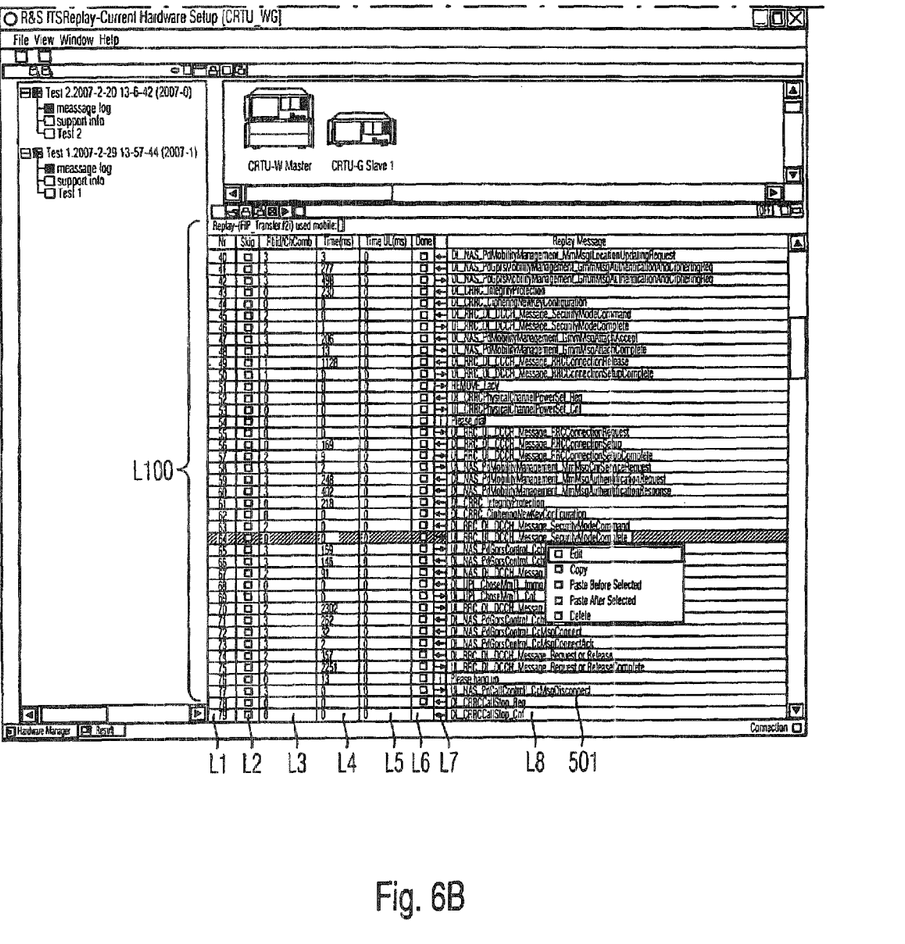

In FIG. 6, the user surface of the software 5", with which completely new test scenarios can be prepared interactively, is shown in the upper window. This allows a highly-flexible testing on the basis of field-test data. Considerable cost savings are achieved, because a test run in a real environment is

The invention claimed is:

1. A method for testing a mobile-radio device, said method comprising:
   determining information regarding at least one real mobile-radio network using a measuring device, and additionally and independently using a mobile-radio device, wherein the mobile radio device is configured to route a signal received from at least one base station of the at least one real mobile-radio network and a response signal transmitted to the at least one base station to an analysis device;
   analyzing the information, received through the measuring device and through the mobile-radio device, regarding the mobile-radio network using the analysis device;
   analyzing all signals incoming to and respectively outgoing from the mobile-radio device using the analysis device;
   converting the information into an instruction sequence; and
   simulating the at least one real mobile-radio network through the implementation of at least a part of the instruction sequence by a test device.

2. The method according to claim 1, wherein the analysis device records additional information regarding the at least one real mobile-radio network, which a mobile-radio device registered within the at least one real mobile-radio network determines, wherein the information and the additional information are converted into a common instruction sequence.

3. The method according to claim 1, wherein the test device is a protocol tester and, within a test scenario, replays the instruction sequence in interaction with the mobile-radio device.

4. The method according to claim 1, wherein the test device is a protocol tester and, within one test scenario, the protocol tester simulates several different mobile-radio networks.

5. The method according to claim 1, wherein the test device is a protocol tester, a part of the instruction sequence is selected, and the protocol tester replays this part of the instruction sequence for the simulation.

6. The method according to claim 1, wherein the test device is a protocol tester, and the instruction sequence is automatically supplemented by the protocol tester with missing instructions necessary for the implementation of the simulation.

7. The method according to claim 1, wherein the instruction sequence is initially output and is editable via a graphic user surface, wherein the test device is controlled with the edited instruction sequence.

8. The method according to claim 1, wherein, in a strict mode, the test device anticipates response signals during a simulation exactly as they were received in the determination of the information of the at least one real mobile-radio network, and the test scenario is terminated if a response signal different from that anticipated is received.

9. The method according to claim 1, wherein, in a tolerant mode, the received response signals can deviate in their sequence from the anticipated response signals, wherein the test scenario is continued.

10. The method according to claim 8, wherein, on the basis of individual response signals of the mobile-radio device, a bit-wise matching of complete response signals and the anticipated response signal is implemented.

11. The method according to claim 1, wherein the test device is a protocol tester, and the protocol tester generates different cell powers within the test scenario and accordingly tests the mobile-radio device with regard to its reception and transmission power.

12. The method according to claim 2, wherein the test device is a protocol tester and, within one test scenario, the protocol tester simulates several different mobile-radio networks.

13. The method according to claim 2, wherein the test device is a protocol tester, a part of the instruction sequence is selected, and the protocol tester replays this part of the instruction sequence for the simulation.

14. The method according to claim 2, wherein the test device is a protocol tester, and the instruction sequence is automatically supplemented by the protocol tester with missing instructions necessary for the implementation of the simulation.

15. The method according to claim 2, wherein the instruction sequence is initially output and is editable via a graphic user surface, wherein the test device is controlled with the edited instruction sequence.

16. The method according to claim 2, wherein, in a strict mode, the test device anticipates response signals during a simulation exactly as they were received in the determination of the information of the at least one real mobile-radio network, and the test scenario is terminated if a response signal different from that anticipated is received.

17. The method according to claim 2, wherein, in a tolerant mode, the received response signals can deviate in their sequence from the anticipated response signals, wherein the test scenario is continued.

18. The method according to claim 16, wherein, on the basis of individual response signals of the mobile-radio device, a bit-wise matching of complete response signals and the anticipated response signal is implemented.

19. The method according to claim 17, wherein, on the basis of individual response signals of the mobile-radio device, a bit-wise matching of complete response signals and the anticipated response signal is implemented.

20. The method according to claim 2, wherein the test device is a protocol tester, and the protocol tester generates different cell powers within the test scenario and accordingly tests the mobile-radio device with regard to its reception and transmission power.

* * * * *